Aug. 27, 1968  G. A. CHAUSTOWICH  3,399,295
THERMOSTATICALLY CONTROLLED ELECTRIC IMMERSION HEATER UNITS
Filed Oct. 20, 1965  2 Sheets-Sheet 1
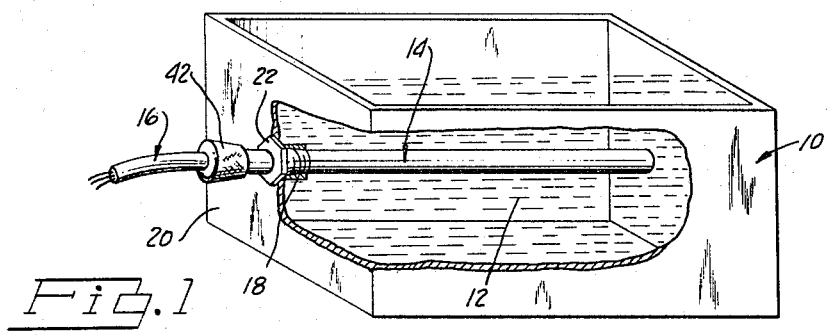
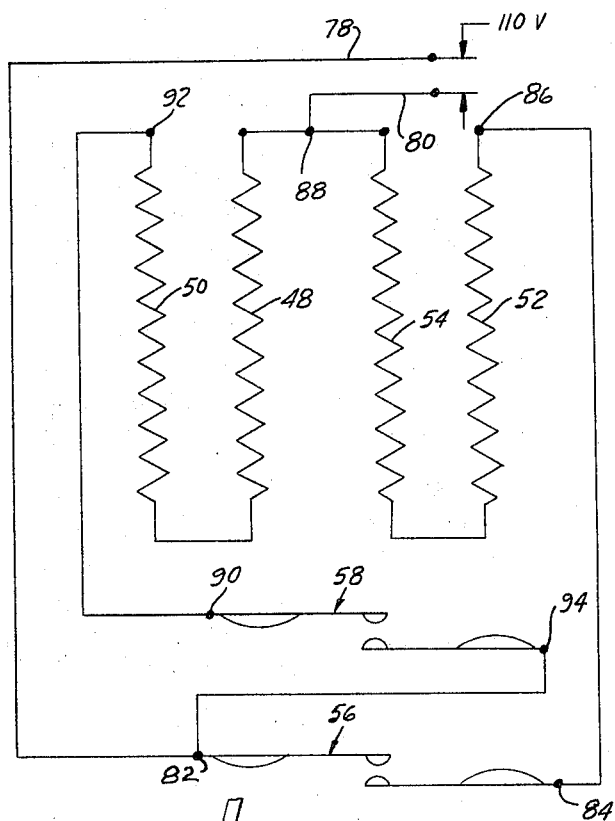
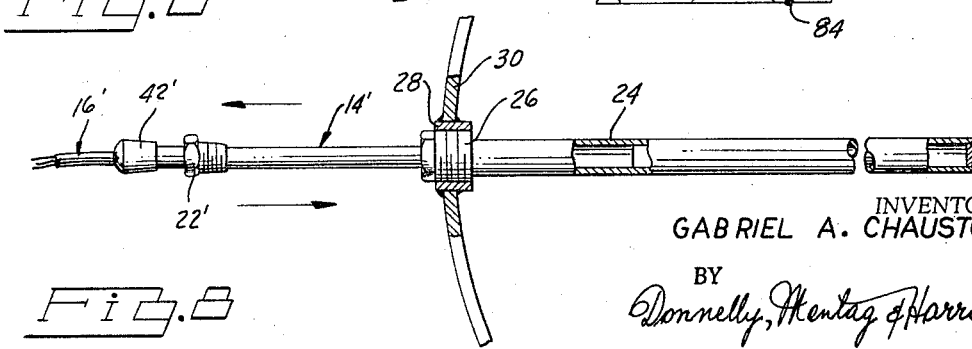
INVENTOR:
GABRIEL A. CHAUSTOWICH
BY
Donnelly, Mentag & Harrington
ATTORNEYS

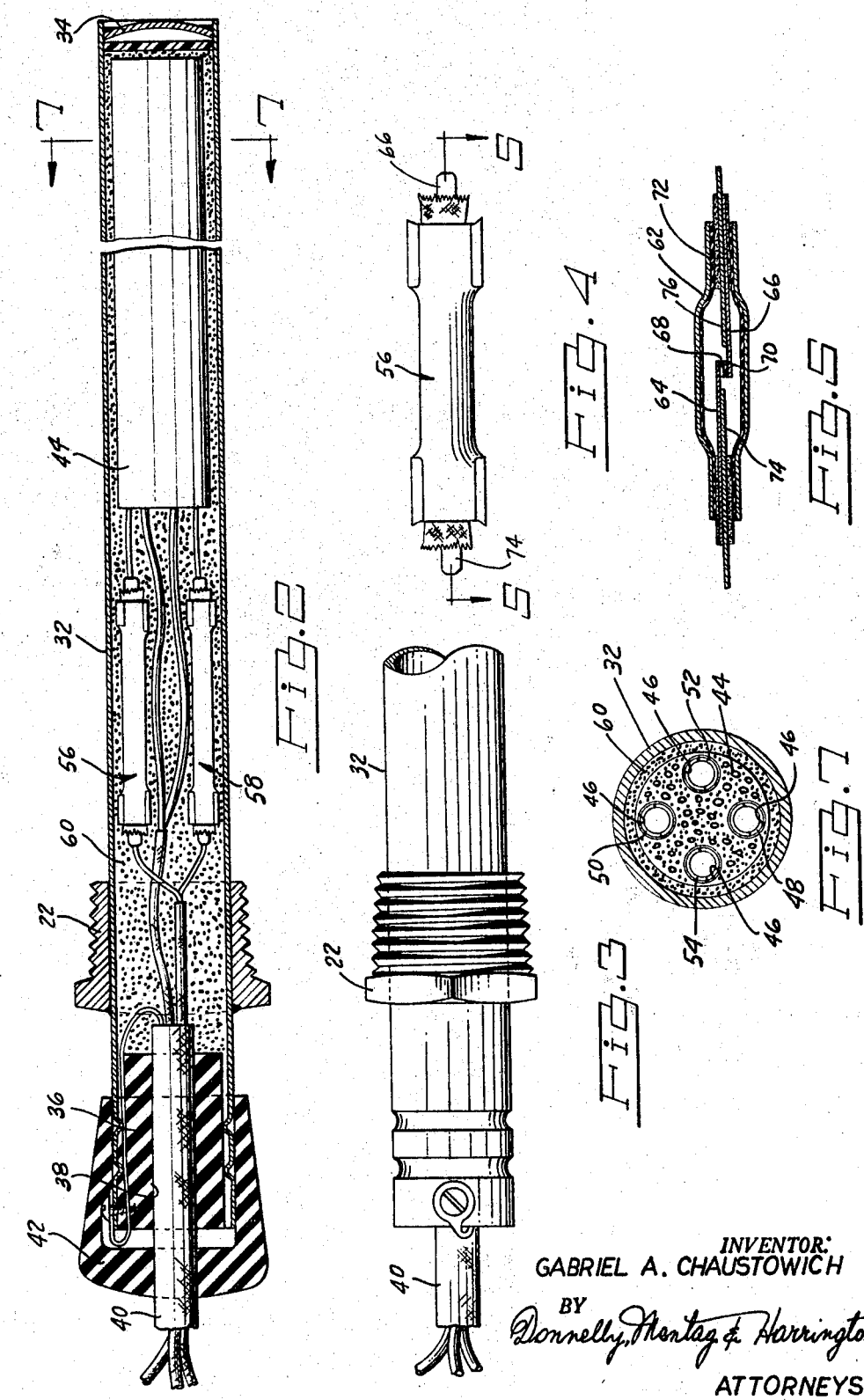

United States Patent Office 3,399,295
Patented Aug. 27, 1968

3,399,295
THERMOSTATICALLY CONTROLLED ELECTRIC IMMERSION HEATER UNITS
Gabriel A. Chaustowich, Detroit, Mich., assignor to Kem Krest Products Co., Detroit, Mich., a corporation of Michigan
Filed Oct. 20, 1965, Ser. No. 498,406
3 Claims. (Cl. 219—523)

ABSTRACT OF THE DISCLOSURE

An electric heater unit for immersion heating a liquid has a pair of thermostats, each accommodating half of the power required by the unit, thereby preventing overloading of the thermostats and improving contact life. The thermostats and the heating coils of the unit are packed with in a suitable insulating material, e.g., granular magnesium oxide, and such establishes a feedback heat flow path, which is independent of the liquid in which the unit is immersed, making it possible for the thermostats to respond to temperature changes in the unit regardless of the extent to which the unit is immersed in the liquid.

---

My invention relates generally to thermostatically controlled immersion heaters, and more particularly to improvements in a portable immersion heater for use in maintaining a controlled temperature in a stored liquid.

A principal feature of my invention resides in the use of a thermostatically controlled electrical heating unit that functions automatically in response to a temperature feedback signal to maintain a calibrated temperature for the liquid with which it is used. The temperature feedback, however, is not dependent upon the liquid as a heat conductor in the heat flow path of the feedback cycle.

The provision of an improved heater of the type above set forth being a principal object of my invention, it is a further object of my invention to provide an electrical, portable, immersion heater unit having tandem heater circuits that function independently. They are controlled by plural temperature sensitive switching elements, each element accommodating only a portion of the total power absorbed by the unit.

I am aware of certain prior art immersion heater units having thermostatically controlled switches that open and close the electric circuit for its electric heating element. The switches in turn are sensitive to the temperature of the liquid. As the temperature of the liquid rises, the switch responds to interrupt the distribution of electrical power to the heating elements. In a device of this type, it has been found that the heating element becomes overheated if, for some reason, the level of the liquid in the reservoir falls to a level that would cause the heating units to emerge from the liquid. Since the proper functioning of the thermostatic switches in such a device depends upon direct heat transfer from the liquid to the switches, the switches cannot respond to changes in temperature if the heating element becomes separated from the liquid. Failure of the device due to excessive temperature occurs rather rapidly. It is an object of my invention to overcome this defect in prior art devices, and to provide an immersion heater having improved reliability that does not depend upon direct heat transfer from the liquid to temperature sensing elements in the electrical circuitry for the heating elements.

The immersion heater unit of my invention includes a steel casing, which encloses at one end thereof electric heating coils disposed in a ceramic case. A thermostatically controlled switching circuit extends from the heating coil to an external voltage course. The thermostatic switching elements and the heating coils are packed with a suitable insulating material such as granular magnesium oxide.

In this environment the thermostatically controlled switches are capable of responding to temperature changes in the heating coils to limit the maximum temperature that can be developed regardless of whether the casing itself is immersed in liquid.

The heater unit is substantially trouble-free and is capable of resisting mechanical shocks and vibrations.

BRIEF DESCRIPTION OF THE FIGURES OF THE DRAWINGS

FIG. 1 shows in isometric form a liquid reservoir with which my improved immersion heater can be used.

FIG. 2 is a longitudinal cross sectional view of my improved immersion heater.

FIG. 3 is an elevation view of one end of the immersion heater shown in FIG. 2.

FIG. 4 is an elevation view of a thermostatic switch used in the circuitry for the heating elements of the structure of FIG. 2.

FIG. 5 is a cross sectional view of the switch of FIG. 4 and is taken along section line 5—5 of FIG. 4.

FIG. 6 is a schematic illustration of the heating element circuit for the structure of FIG. 2.

FIG. 7 is a transverse cross section view taken along section line 7—7 of FIG. 2.

FIG. 8 is a modified form of my invention.

PARTICULAR DESCRIPTION OF THE INVENTION

In FIG. 1 numeral 10 designates a reservoir in the form of a tank which contains liquid 12. Located in the liquid 12 is my improved immersion heater which is identified by reference character 14. Electrical leads 16 extend from the outboard end of the heater 14.

When my heater 14 is assembled as shown in FIG. 1, it is capable of maintaining a uniform temperature of the liquid 12. It can be held in place by means of a threaded collar 18 formed in one wall 20 of the reservoir 10. Threadably received within the collar 18 is an adaptor 22 which is secured in turn to the heater 14.

In FIG. 8 I have illustrated an alternate embodiment of my invention which comprises a hollow, steel tubular casing 24. This is secured to the threaded fitting 26. This may be threadably received within a threaded collar 28 fixed within an opening formed in one side of a liquid containing vessel such as a drum 30.

The adaptor 26 is internally threaded to receive the adaptor 22' of immersion heater 14'. This adaptor 22' corresponds to the adaptor 22 in the embodiment of FIG. 1. The heater 14' corresponds to the heater 14 of the embodiment of FIG. 1.

The casing 24 is surrounded continuously by the liquid in the drum 30. The heater 14' can be inserted within the casing 24 and can be readily withdrawn simply by securing and releasing the adaptor 22' from the threaded opening in the adaptor 26. It is not necessary that the heater 14' come in direct contact with the liquid in the drum 30.

The arrangement of FIG. 8 is preferable when corrosive liquids are used or when high vicosity liquids such as heavy hydrocarbon greases are used. The latter sometimes assume a semi-solid state at low temperatures. This normally would prevent the insertion of the heating element. Entry and withdrawal of the heater 14' can readily be accomplished, however, by reason of the presence of sleeve 24.

In FIG. 2 the heater 14 is shown in more particular detail. It includes a cylindrical metallic casing 32 which is closed at one end by a closure plug 34. Located at one end is the threaded adaptor 22. A closure plug in the form of a rubber insert 36 is received within the left hand end of the casing 32. A ground wire is clamped between casing 32 and the plug 36. The plug 36 is formed with a cylindrical, central opening 38 which receives a multiple lead conduit 40. A rubber cap 42 is received over the end of the casing 32. The conduit 40 extends through the cap 42.

Located within the casing 32 is a ceramic member 44. It is formed with a plurality of openings 46 as indicated in FIG. 7. Extending through each opening 46 is an electrical heater coil. These coils are identified in FIG. 6 by reference numerals 48, 50, 52 and 54.

The electrical circuitry for the heater coils 48, 50, 52 and 54 includes a pair of thermostatically controlled switches 56 and 58.

A filler, which may be magnesium oxide, completely fills the casing 32 and surrounds the ceramic member 44 and the thermostatic switches 56 and 58. The magnesium oxide is identified by reference character 60. It acts as a thermal insulator as well as a cushion for absorbing mechanical vibrations and shocks that normally would damage the heating elements and the ceramic member 44.

The thermostatic switches 56 and 58 may be identical in form. One switch 56 is shown in particular detail in FIGS. 4 and 5.

Switch 56 includes a casing 62 which may be of hollow form. Extending axially through the casing 62 is a contact bar 64. A corresponding bar 66 cooperates with the bar 64. Each bar 64 and 66 carries a contact point as shown at 68 and 70, respectively.

Inside the casing 62 is a liner, such as insulating asbestor 72. This shields the interior of the casing 62 from changes in temperature that occur on the exterior of the casing. Located in juxtaposed relationship with respect to the bar 64 is a bi-metal strip 74. A corresponding bi-metal strip 76 is located directly adjacent the bar 66.

The strip 74 and the bar 64 are secured by crimping at the left hand end of the casing 62. The strip 76 and the bar 66 also are held within the right hand end of the casing 62 by crimping.

Bars 64 and 66 are adapted to conduct the full amount of electric current for their associated heater coils. The bi-metallic bars 74 and 76 are not required to accommodate electrical current and thus are not influenced by changes in temperature that otherwise would occur due to the inherent electrical resistance of these bars.

If the bars 74 and 76 become heated due to changes in the ambient temperature, they will move their respective arms 64 and 66 away from each other thereby breaking contact of the contact points 68 and 70. As the temperature again falls to a calibrated value, the strips 74 and 76 will permit the bars 64 and 66 to assume again the position shown in FIG. 5 thereby allowing a completion of the electrical circuit.

For a better understanding of the circuitry involved, reference may be made to FIG. 6. It will be seen from FIG. 6 that the heater coils 48, 50, 52 and 54 are arranged in parallel relationship. A voltage source is received through lines 78 and 80. Line 78 is connected directly to one terminal point 82 for the thermostatic switch 56. The other terminal point 84 for the switch 56 is connected to one end 86 of the heater coil 52. The other end of the coil 52 is connected to one end of the coil 54. The terminal 88 for the coil 54 is connected to the power line 80.

One terminal 90 for the companion thermostatic switch 58 is connected to one end 92 for heater coil 50. The other end of the coil 50 is connected to one end of the coil 48, the latter having a terminal that is common to the corresponding terminal for the coil 54, namely the end 88.

Terminal 82 for switch 56 is connected to terminal 94 for switch 58. During operation of the improved heater of my invention, the switches 58 and 56 open and close as the temperature varies within predetermined limits.

Each switch may be calibrated independently with the same limits.

If it is assumed that the liquid in which the heater is immersed is at a relatively low temperature, the switch 58 and the switch 56 both will be closed. Power then is distributed through the line 80, through heater coil 48, through coil 50 and through the switch 58 to the line 78, thus completing the circuit for the coils 48 and 50. It will be noted that the switch 56 forms no part of this circuit. On the other hand, power is distributed through coils 54 and 52 from line 80 to the switch 56. It then is transferred to the line 78 in parallel relationship with respect to the switch 58. Switch 58, however, forms no part of the circuit for the coils 52 and 54.

The opening and closing of the switches 58 and 56 individually controls the tandem heater coils with which they are associated. One switch accommodates only half of the power required by the heater coils. This feature prevents overloading of the switches and improves contact life.

As the heating elements become heated, the thermostatic switches also become heated as the heat travels along the casing. When the heat reaches a predetermined value, the switches open. Thus, heat transfer occurs regardless of whether the casing 32 is immersed in the liquid or is in the ambient air. If the casing 32 is immersed in liquid, the liquid will draw heat off from the casing 32 whereby tending to reduce its temperature. Heat then will not be transferred as readily to the thermostatic switches. Thus the heating elements will be effective to raise the temperature of the liquid until the calibrated temperature point for the switches is reached.

The asbestos lining in the casings for the switches avoids a so-called "hunting" condition of the switches. Minor variations of temperature then will not cause unwanted opening and closing of the circuits of the heater coils. Only a sustained and controlled temperature which exceeds the calibrated values for the switches will effect a thermal response of the switches. The switches will not respond to transient temperature changes.

The heating element of the embodiment of FIG. 8 may be substantially identical to the heating element of FIG. 1 although it is used in the FIG. 8 embodiment with the second external shell. An air gap exits then between the casing of heating element 14' and the sleeve 24. The use of the sleeve 24 avoids carbonizing of materials, especially when hydrocarbon type liquids are employed. It also protects the heating element 14' from corrosion such as that which would occur if caustic materials were used.

Having thus described a preferred form of my invention, what I claim and desire to secure by U.S. Letters Patent is:

1. An immersion heater comprising a metallic shell, a plurality of heating elements in said shell, an electrical circuit comprising parallel portions communicating separately with separate ones of said heating elements, and a thermostatically controlled switching means disposed in and partly defining each circuit portion for opening the circuit for said heating elements when the ambient temperature reaches a calibrated value, said casing being adapted to transfer heat from said heating elements to said switching means thereby causing the same to respond to a temperature build-up in said casing, and an insulating material in granular form disposed in said casing in surrounding disposition with respect to said heating elements and said switching means.

2. An immersion heater comprising a metallic shell, a plurality of heating elements in said shell, an electrical circuit comprising parallel portions communicating separately with separate ones of said heating elements, and a thermostatically controlled switching means disposed in and partly defining said circuit portions for opening the circuit for said heating elements when the ambient temperature reaches a calibrated value, said casing being adapted to transfer heat from said heating elements to said switching means thereby causing the same to respond to a temperature build-up in said casing, a ceramic member having axially disposed openings in said casing, said heating elements being situated in said openings, and insulating material in granular form in said casing in surrounding disposition with respect to said switching means and said ceramic member.

3. An immersion heater for controlling the temperature of a liquid in a liquid reservoir comprising a casing adapted to be submerged in said liquid, a ceramic member in said casing, axially disposed openings in said ceramic member, heater elements in said openings, said heater elements being connected together in parallel relationship in an electric circuit, a separate thermostatic switch situated in and partly defining the circuit for each parallel heater element, said thermostatic switches being situated in said cassing adjacent said ceramic member, said switches being adapted to open said circuit when the ambient temperature reaches a predetermined value, said switches responding to a change in temperature of said casing to control the power distributed to said heater elements, and an insulating material in granular form surrounding said ceramic member and said thermostatic switches thereby thermally insulating the same and mechanically insulating the same against shock.

References Cited
UNITED STATES PATENTS

| | | | |
|---|---|---|---|
| 1,416,482 | 5/1922 | Longoria | 219—328 X |
| 1,837,000 | 12/1931 | Wertz | 219—331 |
| 2,192,655 | 3/1940 | Smith | 219—523 X |
| 2,437,262 | 3/1948 | Levitt et al. | 219—328 X |
| 2,448,669 | 9/1948 | Green | 219—523 X |
| 2,750,487 | 6/1956 | Hynes | 219—523 X |
| 2,789,201 | 4/1957 | Sherwin | 219—523 |
| 2,792,474 | 5/1957 | Dales | 200—138 |
| 3,171,015 | 2/1965 | Grinde | 219—523 X |

ANTHONY BARTIS, *Primary Examiner.*